United States Patent
Darde et al.

(10) Patent No.: US 9,109,831 B2
(45) Date of Patent: Aug. 18, 2015

(54) PROCESS AND APPARATUS FOR THE SEPARATION OF A GASEOUS MIXTURE

(75) Inventors: Arthur Darde, Paris (FR); Bao Ha, San Ramon, CA (US); Jean-Pierre Tranier, L'Hay-les-Roses (FR)

(73) Assignees: AIR LIQUIDE GLOBAL E&C SOLUTIONS US Inc., Houston, TX (US); L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 1208 days.

(21) Appl. No.: 11/776,475

(22) Filed: Jul. 11, 2007

(65) Prior Publication Data

US 2009/0013717 A1 Jan. 15, 2009

(51) Int. Cl.
*F25J 3/00* (2006.01)
*F25J 3/02* (2006.01)
*F25J 3/04* (2006.01)

(52) U.S. Cl.
CPC ............ *F25J 3/0266* (2013.01); *F25J 3/04533* (2013.01); *F25J 2200/02* (2013.01); *F25J 2200/04* (2013.01); *F25J 2200/70* (2013.01); *F25J 2200/76* (2013.01); *F25J 2205/04* (2013.01); *F25J 2210/04* (2013.01); *F25J 2210/70* (2013.01); *F25J 2215/04* (2013.01); *F25J 2220/82* (2013.01);
(Continued)

(58) Field of Classification Search
USPC ................ 62/606, 617, 928; 95/236
See application file for complete search history.

(56) References Cited

U.S. PATENT DOCUMENTS

| 3,130,026 A | 4/1964 | Becker | |
|---|---|---|---|
| 3,498,067 A * | 3/1970 | Ranke | ............ 62/635 |

(Continued)

FOREIGN PATENT DOCUMENTS

| EP | 0417992 | 3/1991 |
|---|---|---|
| EP | 0 503 910 | 3/1992 |

(Continued)

OTHER PUBLICATIONS

"Oxy-Combustion Processes for $CO_2$ Capture from Power Plant", IEA Report No. 2005/9, Sep. 2005, Process Flow Diagrams 6, p. 1, and 11, p. 1.

(Continued)

*Primary Examiner* — Marc Norman
*Assistant Examiner* — Jon T Schermerhorn
(74) *Attorney, Agent, or Firm* — Justin K. Murray

(57) ABSTRACT

A process for separating carbon dioxide from a carbon dioxide containing fluid comprises the steps of: compressing the fluid in a compressor to form a compressed fluid, drying at least part of the compressed fluid to form a compressed and dried fluid, cooling at least part of the compressed and dried fluid to form a compressed, dried and cooled fluid, separating the compressed, dried and cooled fluid at a temperature lower than 0° C. into a carbon dioxide rich stream, a carbon dioxide lean stream and at least one intermediate purity liquid stream having a carbon dioxide purity lower than that of the carbon dioxide rich stream and higher than that of the carbon dioxide lean stream, expanding at least one intermediate purity liquid stream to produce at least one expanded stream using at least one expanded stream to cool the compressed and dried fluid and recycling at least part of the expanded stream.

4 Claims, 4 Drawing Sheets

(52) U.S. Cl.
CPC .......... *F25J 2220/84* (2013.01); *F25J 2230/08* (2013.01); *F25J 2230/20* (2013.01); *F25J 2230/30* (2013.01); *F25J 2230/42* (2013.01); *F25J 2240/12* (2013.01); *F25J 2245/02* (2013.01); *F25J 2260/80* (2013.01); *F25J 2270/02* (2013.01); *Y02C 10/12* (2013.01)

(56) References Cited

U.S. PATENT DOCUMENTS

| | | | |
|---|---|---|---|
| 4,441,900 A | | 4/1984 | Swallow |
| 4,528,002 A * | | 7/1985 | Linde ................ 95/174 |
| 5,233,837 A * | | 8/1993 | Callahan ............ 62/621 |
| 5,927,103 A | | 7/1999 | Howard |
| 5,974,829 A * | | 11/1999 | Novak et al. ......... 62/617 |
| 6,035,662 A * | | 3/2000 | Howard et al. ....... 62/617 |
| 2007/0122328 A1* | | 5/2007 | Allam et al. ......... 423/235 |
| 2007/0231244 A1* | | 10/2007 | Shah et al. .......... 423/437.1 |
| 2008/0245101 A1 | | 10/2008 | Dubettier-Grenier et al. |

FOREIGN PATENT DOCUMENTS

| | | |
|---|---|---|
| FR | 2872890 | 1/2006 |
| FR | 2884305 | 10/2006 |
| JP | 54-115691 | 9/1979 |
| JP | 04-359785 | 12/1992 |
| JP | 08-501142 | 2/1996 |
| JP | 2007-509745 | 4/2007 |
| WO | 2005/004424 | 5/2005 |
| WO | WO 2007/126972 | 11/2007 |

OTHER PUBLICATIONS

PCT/IB2008/052792, International Search Report and Written Opinion, Jul. 6, 2012.
PCT/IB2008/052792, Notification Concerning Transmittal of International Preliminary Report on Patentability (PCT/IB/326).
JP Office Action dated Jun. 18, 2013 (Japanese Patent Application No. 2010-515649).

* cited by examiner

PROCESS AND APPARATUS FOR THE SEPARATION OF A GASEOUS MIXTURE

TECHNICAL FIELD

The present invention relates to a process and apparatus for the separation of gaseous mixture containing carbon dioxide as main component. It relates in particular to processes and apparatus for purifying carbon dioxide, for example coming from combustion of a carbon containing fuel, such as takes place in an oxycombustion fossil fuel or biomass power plant.

BACKGROUND ART

The combustion of carbon containing fuels (biomass, waste, fossil fuels such as coal, lignite, hydrocarbons, . . . ) produces $CO_2$ and gases, such as $SO_2$, $SO_3$, NOx, which pollute the atmosphere and are major contributors to the greenhouse effect especially $CO_2$. These emissions of $CO_2$ are concentrated in four main sectors: power generation, industrial processes, transportation, and residential and commercial buildings. The main application of $CO_2$ capture is likely to be in power generation and large energy consuming industries, particularly cement, iron and steel and chemical production and oil refining. Capturing $CO_2$ directly from small and mobile sources in the transportation and domestic and commercial buildings sectors is expected to be significantly more difficult and expensive. Most of the emissions of $CO_2$ to the atmosphere from the electricity generation and industrial sectors are currently in the form of flue gas from combustion, in which the $CO_2$ concentration is typically 4-14% by volume, although $CO_2$ is produced at high concentrations by a few industrial processes. In principle, flue gas could be stored, to avoid emissions of $CO_2$ to the atmosphere it would have to be compressed to a pressure of typically more than 100 bar abs and this would consume an excessive amount of energy. Also, the high volume of the flue gas would mean that storage reservoirs would be filled quickly. For these reasons it is preferable to produce relatively high purity stream of $CO_2$ for transport and storage; this process is called $CO_2$ capture. This carbon dioxide could be used for enhanced oil recovery or just injected in depleted gas and oil fields or in aquifers.

The present invention is based on application to the power generation sector. Nevertheless, it could also be applied to flue gases coming from other industrial processes with a relatively high purity, above 50% by volume (dry base).

There are three main techniques for capture of $CO_2$ in power plants:

Post-combustion: the flue gas from a power station is scrubbed with a chemical solvent such as an aqueous solution of amines which will remove the $CO_2$ by absorption;

Pre-combustion: the fuel together with oxygen is sent to a gasifier where a synthesis gas (main component of the mixture: $H_2$, CO and $CO_2$) is produced. CO is then shifted to $H_2$ and $CO_2$ (CO+H2O< >$CO_2$+$H_2$) and $CO_2$ is scrubbed by a physical or chemical solvent. A mixture containing essentially $H_2$ and $N_2$ is sent to a gas turbine where it is burnt.

Oxycombustion: in order to increase the carbon dioxide content in the flue gas, the fuel is burnt with a mixture of mainly carbon dioxide and oxygen instead of air. This mixture of oxygen and carbon dioxide is obtained by recycling part of the flue gas rich in carbon dioxide and mixing it with oxygen (typically at 95% purity) coming from a cryogenic air separation unit. The flue gas is then purified in order to remove components like water and oxygen and compressed to a pressure between 100 and 200 bar abs in order to be injected underground (see FIG. 1). It should be noted that the recycling of flue gases would not be necessary with high temperature materials for the boiler. However, they do not exist at the time of invention. The recycling of flue gases is not mandatory for the invention disclosed here in.

EP-A-0503910 describes a process for the recovery of carbon dioxide and other acid gases from flue gases coming from a power plant using the oxycombustion technique A more recent document on the same subject is "Oxy-Combustion Processes for $CO_2$ Capture from Power Plant" IEA Report No. 2005/9, September 2005, Process Flow Diagrams 6, p. 1, and 11, p. 1.

The purpose of this invention is to improve the solution proposed in this patent both in term of specific energy and/or carbon dioxide recovery and/or carbon dioxide product purity.

SUMMARY OF THE INVENTION

According to an object of the invention, there is provided a process for separating carbon dioxide from a carbon dioxide containing fluid comprising the steps of:
i) compressing the fluid in a compressor to form a compressed fluid
ii) drying at least part of the compressed fluid to form a compressed and dried fluid
iii) cooling at least part of the compressed and dried fluid to form a compressed, dried and cooled fluid
iv) separating the compressed, dried and cooled fluid at a temperature lower than 0° C. into a carbon dioxide rich stream, a carbon dioxide lean stream and at least one intermediate purity liquid stream having a carbon dioxide purity lower than that of the carbon dioxide rich stream and higher than that of the carbon dioxide lean stream
v) expanding at least one intermediate purity liquid stream to produce at least one expanded stream
vi) using at least one expanded stream to cool the compressed and dried fluid in step iii) and
vii) recycling at least part of the expanded stream used to cool compressed and dried fluid to a point upstream of step iv).

According to other optional aspects of the invention:
the separation step iv) includes at least one of a low temperature distillation step and a low temperature phase separation step.
the intermediate purity liquid stream is expanded in a valve.
the intermediate purity liquid stream is expanded in a liquid expander.
a single intermediate purity stream is expanded to form a single expanded stream and the single expanded stream is used to cool the compressed and dried gas.
a first intermediate purity stream is expanded to form a first expanded stream and a second intermediate purity stream is expanded to form a second expanded stream and at least one of the expanded streams is used to cool the compressed and dried gas.
the first intermediate purity stream is expanded to form an expanded stream at a first pressure and the second intermediate purity stream is expanded to form an expanded stream at a second pressure, higher than the first pressure.

at least part of the carbon dioxide lean stream is sent to the atmosphere.

According to a further aspect of the invention, there is provided an apparatus for separating carbon dioxide from a carbon dioxide containing fluid comprising:
i) a compressor for compressing the fluid to form a compressed fluid
ii) a drying unit for drying at least part of the compressed fluid to form a compressed and dried fluid
iii) a heat exchanger adapted to cool at least part of the compressed and dried fluid to form a compressed, dried and cooled fluid
iv) a separation unit for separating the compressed, dried and cooled fluid at a temperature lower than 0° C. into a carbon dioxide rich stream, a carbon dioxide lean stream and at least one intermediate purity liquid stream having a carbon dioxide purity lower than that of the carbon dioxide rich stream and higher than that of the carbon dioxide lean stream
v) at least one expansion unit expanding at least one intermediate purity liquid stream to produce at least one expanded stream
vi) a conduit for sending the at least one expanded stream to the heat exchanger to cool the compressed and dried fluid and
vii) a conduit to send the at least one expanded stream from the heat exchanger to at least one of the compressor and the drying unit.

According to further optional aspects of the invention:
the separation unit includes at least one of a low temperature distillation column and a low temperature phase separator.
the expansion unit comprises at least a valve and comprising a conduit for sending the intermediate purity liquid stream to the valve.
the expansion unit comprises at least one liquid expander and comprising a conduit for sending the intermediate purity liquid stream to the liquid expander.
the expansion unit comprises a first expansion means wherein a first intermediate purity stream is expanded to form a first expanded stream and a second expansion means wherein a second intermediate purity stream is expanded to form a second expanded stream and at least one of the expanded streams is used to cool the compressed and dried gas.
the first intermediate purity stream is expanded to form an expanded stream at a first pressure and the second intermediate purity stream is expanded to form an expanded stream at a second pressure, higher than the first pressure.

BRIEF DESCRIPTION OF DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF THE INVENTION

Figure 1:
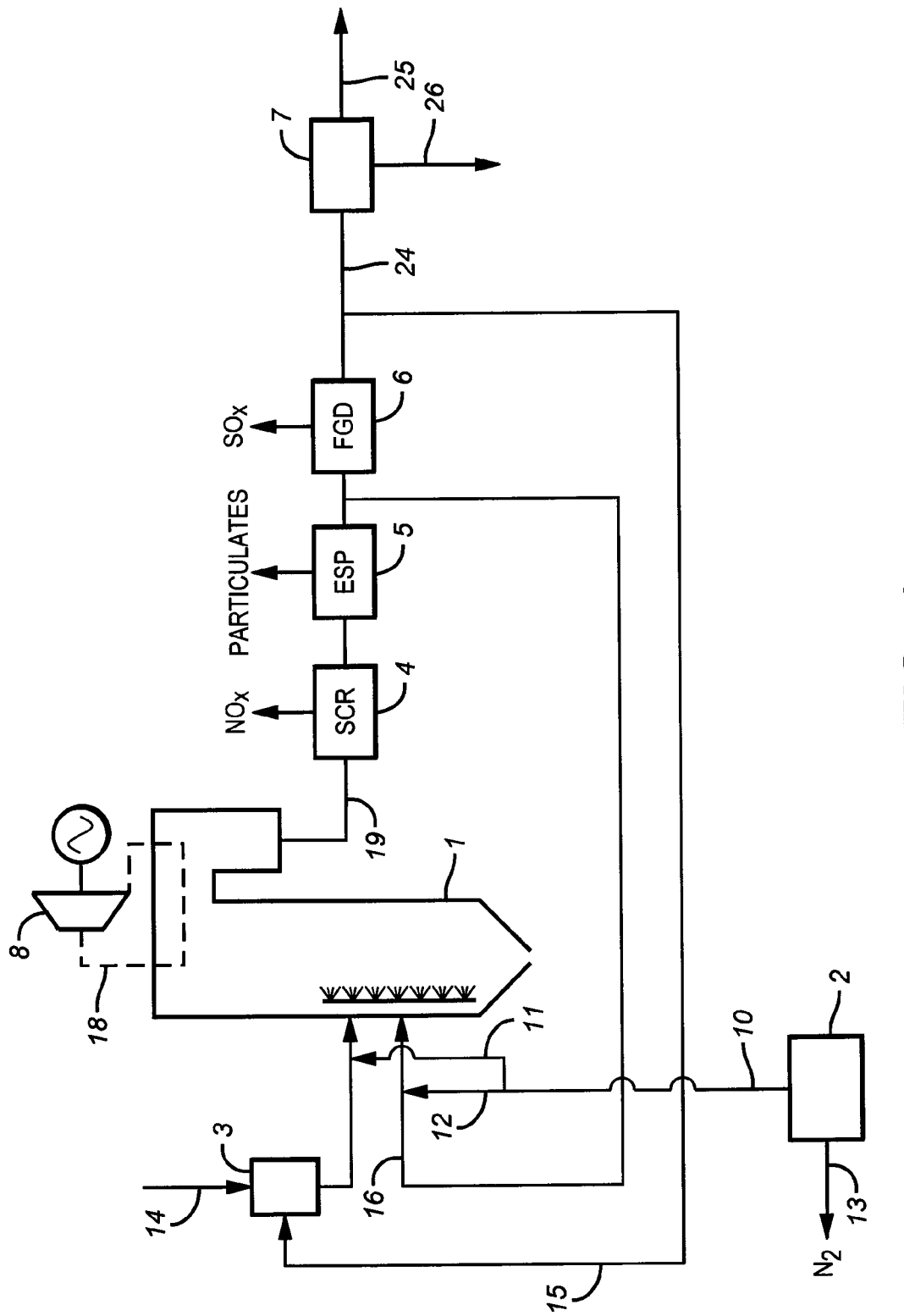
FIG. 1 is a schematic representation of an oxycombustion process wherein the flue gas is purified in order to remove components like water and oxygen and compressed in order to be injected underground.
Figure 3:
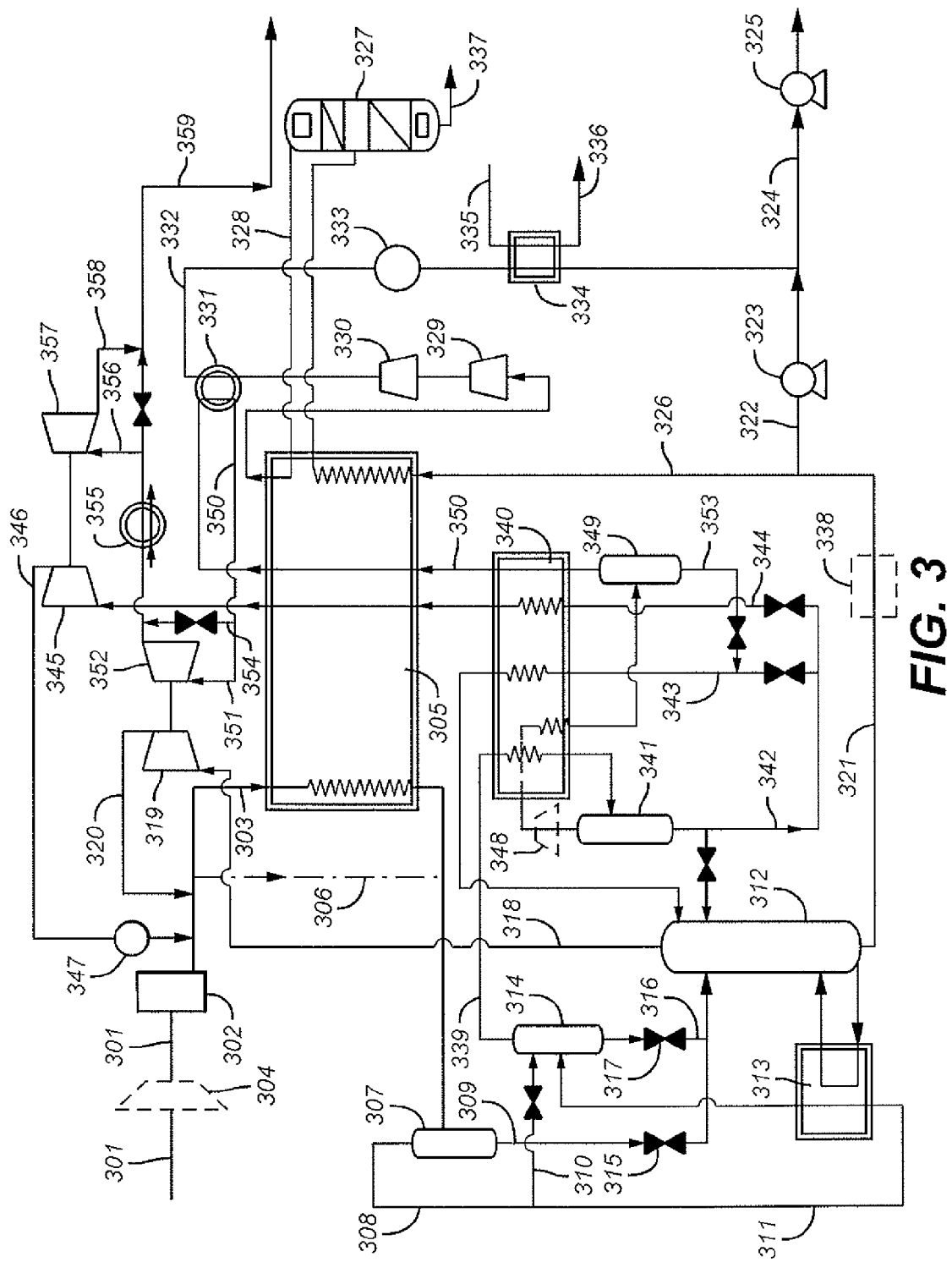
FIG. 3 shows a low temperature purification unit that could be used as unit 104 in FIG. 2.
Figure 4:
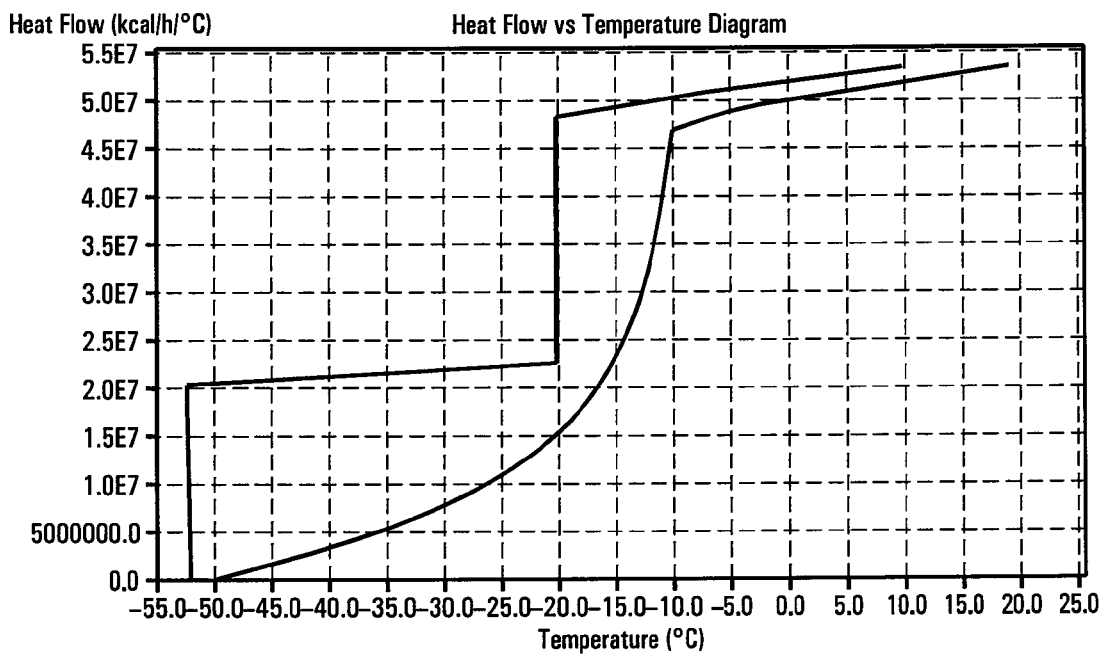
FIG. 4 shows a heat exchange diagram for heat exchange between a vaporizing high purity carbon dioxide stream and a cooling and condensing feed stream.
Figure 5:
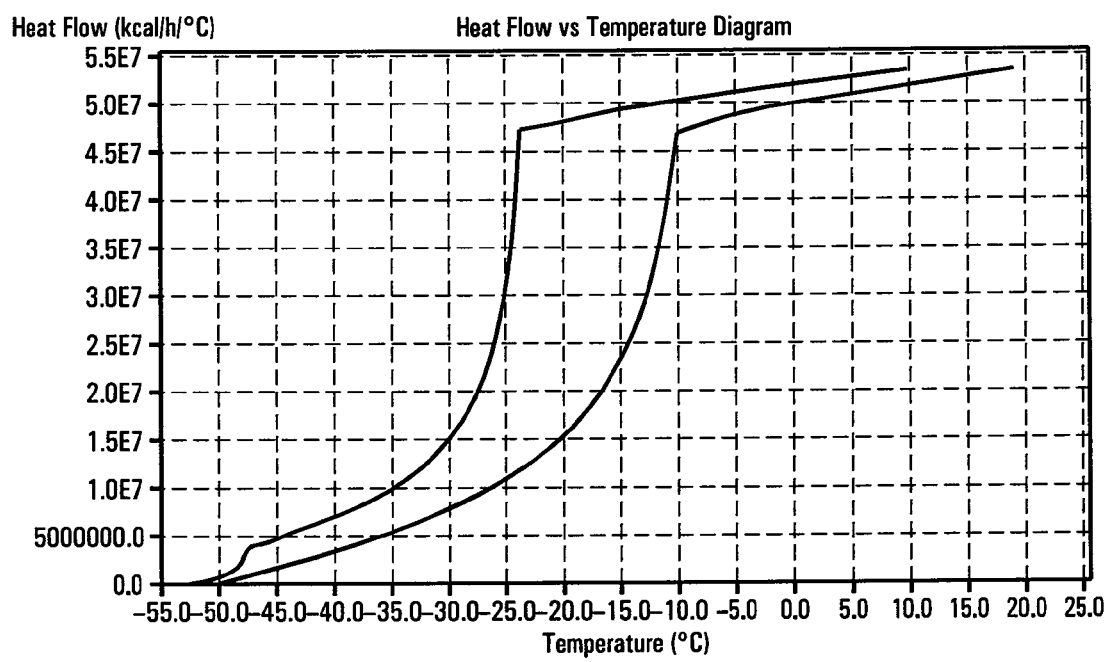
FIG. 5 shows a heat exchange diagram for heat exchange between an intermediate purity carbon dioxide stream and a cooling and condensing feed stream as observed in exchanger 55 of FIG. 3.

The invention will now be described in further detail with reference to the figures of which FIGS. 1 and 3 show apparatuses according the invention, in varying degrees of detail, going from FIG. 1 which is the least detailed to FIG. 3 which is the most detailed. FIGS. 4 and 5 show heat exchange diagrams for the prior art and one of the exchangers of FIG. 3 respectively.

FIG. 1 is a schematic view of an oxycombustion plant. Air separation unit 2 produces an oxygen stream 10 at a typical purity of 95-98 mol. % and a waste nitrogen stream 13. Oxygen stream 10 is split into two sub streams 11 and 12. The primary flue gas recycle stream 15 passes through coal mills 3 where coal 14 is pulverized. Substream 11 is mixed with the recycle stream downstream of the coal mills 3 and the mixture is introduced in the burners of the boiler 1. Sub stream 12 is mixed with secondary flue gas recycle stream 16 which provides the additional ballast to the burners to maintain temperatures within the furnace at acceptable levels. Water stream(s) is introduced in the boiler 1 in order to produce steam stream(s) 18 which is expanded in steam turbine 8. Flue gas stream 19 rich in $CO_2$, typically containing more than 70 mol. % on a dry basis, goes through several treatments to remove some impurities. Unit 4 is NOx removing system like selective catalyst reduction. Unit 5 is a dust removal system such as electrostatic precipitator and/or baghouse filters. Unit 6 is a desulfurization system to remove $SO_2$ and/or $SO_3$. Units 4 and 6 may not be necessary depending on the $CO_2$ product specification. Flue gas stream 24 is then introduced in a compression and purification unit 7 in order to produce a high $CO_2$ purity stream 25 which will be sequestrable and a waste stream 26.

Figure 2:
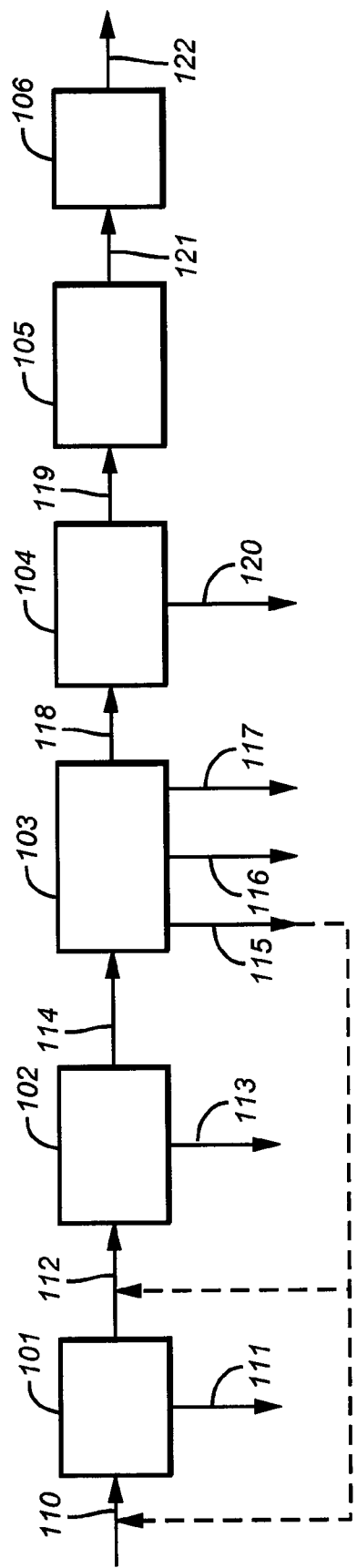
FIG. 2 is a schematic view of a compression and purification unit which could be used as unit 7 in FIG. 1.

FIG. 2 is a schematic view of a compression and purification unit which could be used as unit 7 in FIG. 1. Flue gas stream 110 (corresponding to stream 24 of FIG. 1) enters a low pressure pretreatment unit 101 where it is prepared for compression unit 102. This unit could include, for example, among other steps:
a dust removal step in a wet scrubber and/or a dry process either dynamic, such as pulse-jet cartridges or static, such as pockets and cartridges
a (further) desulfurization step in a wet scrubber with water and/or soda ash or caustic soda injection
a cooling step in order to minimize the flow through water condensation and the power of compression unit both due to flow and temperature reduction.

Waste stream(s) 111 could consist of condensed water, dust and dissolved species like $H_2SO_4$, $HNO_3$, $Na_2SO_4$, $CaSO_4$, $Na_2CO_3$, $CaCO$ . . . . Compression unit 102 compresses stream 112 from a pressure close to atmospheric pressure to a high pressure typically between 15 and 60 bar abs, preferably around 30 bar abs. This compression could be done in several stages with intermediate cooling. In this case, some condensate(s) 113 could be produced. Heat of compression could also be recovered in these intermediate cooling step, for example to preheat boiler feed water. Hot stream 114 leaves the compression unit 102 and enters a high pressure pretreatment unit 103. This unit at least includes:

one or several cooling step(s) in order to decrease the temperature and decrease the water content a drying step to remove most of the water, for example by adsorption and could include (non-exhaustive list):

a high pressure washing column for cooling and/or purification a mercury removal step Effluents from this unit are gaseous stream 115 (regeneration stream of the drying step) and could be liquid stream(s) 116/117 (from the cooling step and/or the high pressure washing column).

The stream 114 may contain $NO_2$. In this case, it is sometimes preferable to remove the $NO_2$ by adsorption upstream of the unit 104. In this case, the stream 114 may be treated by adsorption and the regeneration gas used to regenerate the adsorbent is removed having a content enriched in $NO_2$ with respect to that of stream 114. The gaseous stream 115 may be recycled at least in part upstream of the compression unit 102, upstream of the pretreatment unit 101 or to the boiler 1 of the combustion unit.

Below 158° C., $NO_2$ is in equilibrium with its polymer/dimer $N_2O_4$. The lower the temperature, the higher the concentration of $N_2O_4$ compared to $NO_2$. In this document, the word $NO_2$ is used to mean not only $NO_2$ but also its polymer/dimer $N_2O_4$ in equilibrium.

Unit 104 is a low temperature purification unit. In this case, low temperature means a minimum temperature in the process cycle for the purification of the flue gas below 0° C. and preferably below −20° C. as close as possible to the triple point temperature of pure $CO_2$ at −56.60° C. In this unit, stream 118 is cooled down and partially condensed in one (or several steps). One (or several) liquid phase stream(s) enriched in $CO_2$ is (are) recovered, expanded and vaporized in order to have a product enriched in $CO_2$ 119. One (or several) non-condensible high pressure stream(s) 120 is (are) recovered and could be expanded in an expander. $CO_2$ enriched product 119 is further compressed in compression unit 105. In unit 106 compressed stream 121 is condensed and could be further compressed by a pump in order to be delivered at high pressure (typically 100 to 200 bar abs) as stream 122 to a pipeline to be transported to the sequestration site.

FIG. 3 shows a low temperature purification unit that could be used as unit 104 in FIG. 2. At least one process according to the invention operates within such a unit.

Stream 301 comprising flue gas at around 30 bar and at a temperature of between 15° C. and 43° C. is filtered in 302 to form stream 303. Stream 301 contains mainly carbon dioxide as well as $NO_2$, oxygen, argon and nitrogen. It may be produced by unit 103 (FIG. 2) directly at the high pressure or may be brought up to the high pressure using optional compressor 304 shown in dashed lines. Stream 303 cools in heat exchange line 305 and is partially condensed. Part 306 of stream 303 may not be cooled in the heat exchange but is mixed with the rest of stream 303 downstream of the heat exchange line to vary its temperature. The partially condensed stream is sent to first phase separator 307 and separated into gaseous phase 308 and liquid phase 309. The gaseous phase 308 is divided in two to form stream 310 and stream 311. Stream 311 is used to reboil column 312 in exchanger 313 and is then sent to a second phase separator 314. Stream 310 by-passes the reboilers in order to control the reboiling duty.

Liquid stream 309 from the first phase separator 307 is expanded in valve 315 and liquid stream 316 is expanded in valve 317, both streams being then sent to the top of column 312. Column 312 serves principally to remove the incondensable components (oxygen, nitrogen, and argon) from the feed stream.

A carbon dioxide depleted stream 318 is removed from the top of column 312 and sent to compressor 319. The compressed stream 320 is then recycled to stream 303.

A carbon dioxide enriched or rich stream 321 is removed from the bottom of column 312 and divided in two. One part 322 is pumped by pump 323 to form stream 324, further pumped in pump 325 and then removed from the system. Stream 324 corresponds to stream 25 of FIG. 1. The rest 326 provides the frigorific balance.

It is desirable to provide means for removing $NO_2$ from the fluid 301 to be separated. In general this involves separating at least part of the fluid 301 into a carbon dioxide enriched stream, a carbon dioxide depleted stream comprising $CO_2$ and at least one of oxygen, argon, and nitrogen and a $NO_2$ enriched stream, and recycling the $NO_2$ enriched stream upstream of the separation step.

The incondensable removal step (removing mainly $O_2$ and/or $N_2$ and/or Ar) may take place before or after the $NO_2$ removal step.

Several types of $NO_2$ removal step may be envisaged, involving distillation and/or phase separation and/or adsorption. The adsorption step may be carried out on a product of the $CO_2$ separation step or the fluid itself before separation.

In FIG. 3, after stream 322 is removed, the rest of the carbon dioxide enriched stream 326 is vaporized in heat exchange line 305 and sent to $NO_2$ removal column 327.

This column may have a top condenser and a bottom reboiler, as shown, the feed being sent to an intermediate point. Alternatively, there need be no bottom reboiler, in which case the feed is sent to the bottom of the column. A $NO_2$ depleted stream 328 is removed from the column and sent back to the heat exchange line. This stream is further warmed, compressed in compressors 329, 330, sent to heat exchanger 331, removed therefrom as stream 332, cooled in exchangers 333, 337 and mixed with stream 322 to form stream 324. Exchanger 333 may be used to preheat boiler feed water. Exchanger 337 is cooled using a refrigerant stream 335 which may be R134a, ammonia, water, water mixed with glycol or any other suitable fluid. The warmed fluid is designated as 336. A $NO_2$ enriched stream 337 is removed from the bottom of the column 327. This stream 337 is then recycled to a point upstream of filter 302.

Alternatively or additionally the separation phase may consist of producing the $NO_2$ enriched stream by adsorption of the $NO_2$ contained in stream 321 in adsorption unit 338.

In either case, at least part of the $NO_2$ enriched stream may be recycled to a unit producing the fluid, such as the combustion zone of a boiler 1 (FIG. 1), as seen previously for stream 115 (FIG. 2). It should be noted that recycling $NO_x$ in the combustion zone does not increase the $NO_x$ content in the flue gas. In other words, recycling $NO_x$ to the combustion zone eliminates NOx.

Additionally or alternatively at least part of the $NO_2$ enriched stream may be recycled to a unit for treating the fluid.

For example the $NO_2$ enriched stream may be recycled upstream of the compressor 304 (if present) or one of units 101, 102 (FIG. 2)

It may be advantageous to recycle at least part of the $NO_2$ enriched stream to a wash column, such as that of pretreatment unit 103 (FIG. 2). In this case, the $NO_2$ may be converted to nitric acid in the wash column and subsequently removed from the system.

In a wash column where SO₂ is present in the flue gas, the recycled NO₂ enriched stream will react with SO₂ to form NO and SO₃ that will immediately turn to H₂SO₄ with water and be removed in the water drain. Therefore, if enough NO₂ is present in the recycled stream, it is a means to remove SOX from the flue gas and to avoid the injection of reactants like soda ash or caustic soda or even a classical flue gas desulphurization.

Top gas 339 from the second phase separator 314 is cooled in heat exchanger 340 and sent to third phase separator 341. Part of the liquid from the phase separator 341 is sent to the column 312 and the rest as the intermediate purity stream 342 is divided in two streams 343, 344. Stream 343 is vaporized in heat exchanger 340 and sent to the top of column 312 or mixed with stream 318.

Stream 344 is expanded in a valve, warmed in heat exchangers 340, 305, compressed in compressor 345, cooled as stream 346 in heat exchanger 347, and mixed with compressed stream 303. The valve used to expand stream 344 could be replaced by a liquid expander.

The top gas from the third phase separator 341 is cooled in heat exchanger 340, optionally after compression by compressor 348 and sent to a fourth phase separator 349. The carbon dioxide lean top gas 350 from fourth phase separator 349 is warmed in heat exchanger 340, then in heat exchanger 305 as stream 350, warmed in exchanger 331 and expanded as stream 351 in expander 352, coupled to compressor 319. The carbon dioxide lean top gas 350 contains between 30 and 45% carbon dioxide and between 30 and 45% nitrogen. It also contains substantial amounts of oxygen and argon. The bottom liquid 353 from phase separator 349 is sent to the column with stream 343.

The stream expanded in expander 352 is mixed with stream 354 which does not pass through the expander and then warmed in 355. Part 356 of the warmed stream is expanded in expander 357 and sent as stream 352, 359 to the atmosphere.

The optional compressor 304 may be powered by one of expanders 357, 352.

Expander 357 is coupled to compressor 345 in the figure.

TABLE 1

Molar fractions in % (example) for O₂, N₂, Ar, CO₂

| FLUIDS | 118 | 33 | 67 | 84 | 157 | 141 | 78 |
|---|---|---|---|---|---|---|---|
| O₂ | 2.5 | 4.8 | 0 | 0 | 13.3 | 2.3 | 0 |
| N₂ | 7.8 | 11 | 0 | 0 | 43.8 | 0.1 | 0 |
| Ar | 1.9 | 4.9 | 0 | 0 | 9.5 | 2.6 | 0 |
| CO₂ | 87.8 | 79.3 | 99.95 | 99 | 33.4 | 95 | 100 |
| NOx | 250 ppm | 50 ppm | 500 ppm | 1 | 5 ppm | 500 ppm | 0 |

FIG. 4 shows a heat exchange diagram for heat exchange between a vaporizing high purity carbon dioxide stream and a cooling and condensing feed stream as known from the prior art.

FIG. 5 shows a heat exchange diagram for heat exchange between an intermediate purity carbon dioxide stream and a cooling and condensing feed stream as observed in exchanger 340 of FIG. 3.

What is claimed is:

1. A process for separating carbon dioxide from a mixture comprising carbon dioxide, NO2, oxygen, argon and nitrogen, the process comprising the steps of:

i) compressing the mixture in a compressor to form a compressed fluid;
   ii) drying at least part of the compressed fluid to form a compressed and dried fluid;
   iii) cooling and partially condensing the compressed and dried fluid in one or more steps to form a partially condensed fluid;
   iv) introducing the partially condensed fluid to a separation system and then recovering one or more liquid phase streams that are enriched in CO2 as compared to the mixture;
   v) introducing the one or more liquid phase streams into a distillation column under conditions effective to separate incondensable components from CO2 to form a bottoms liquid and a top gas, the bottom liquid comprised substantially of CO2 and trace amounts of NO2, the top gas comprised substantially of oxygen, nitrogen, and argon;
   vi) withdrawing the top gas from the distillation column, compressing the top gas, and then recycling the top gas to a point upstream step iii)
   vi) withdrawing the bottoms liquid from the distillation column and dividing the bottoms liquid into a first product stream and a second product stream;
   vii) pressurizing the first product stream and sending the first product stream to an end user;
   viii) warming the second product stream and then introducing the second product stream into a NO2 removal device under conditions effective for removing NO2 from the second product stream to form a CO2 enriched product stream and a NO2 enriched stream;
   ix) withdrawing a slip stream from the one or more liquid phase streams that are enriched in CO2 from step iv);
   x) splitting the slip stream into a first intermediate stream and a second intermediate stream, such that the first intermediate stream and the second intermediate stream have the same composition;
   xi) expanding the first intermediate stream to a first pressure, vaporizing the first intermediate stream and then introducing the vaporized stream to the distillation column or mixing with the top gas from step vi); and
   xii) expanding the second intermediate stream to a second pressure, warming the second intermediate stream, compressing the second intermediate stream and then recycling the compressed second intermediate stream with the mixture upstream step iii),
   wherein the latent heat of the first and second intermediate streams is used to cool the compressed and dried fluid in step iii).

2. The process of claim 1, wherein the separation system comprises three liquid gas separators in series arrangement with each other, wherein the first liquid gas separator send its gas stream to the second liquid gas separator, wherein the second liquid gas separator sends its gas stream to the third liquid gas separator following a cooling step.

3. The process of claim 1, wherein the first intermediate purity stream is expanded to form a first expanded stream at a first pressure and the second intermediate purity stream is expanded to form a second expanded stream at a second pressure, higher than the first pressure.

4. The process of claim 1, wherein a slip stream is taken from the compressed and dried fluid prior to cooling and combining the slip stream with the partially condensed fluid prior to step iv).

* * * * *